Jan. 4, 1949.    J. S. PINAIRE    2,458,024
EXPANSION JOINT
Filed Feb. 12, 1945
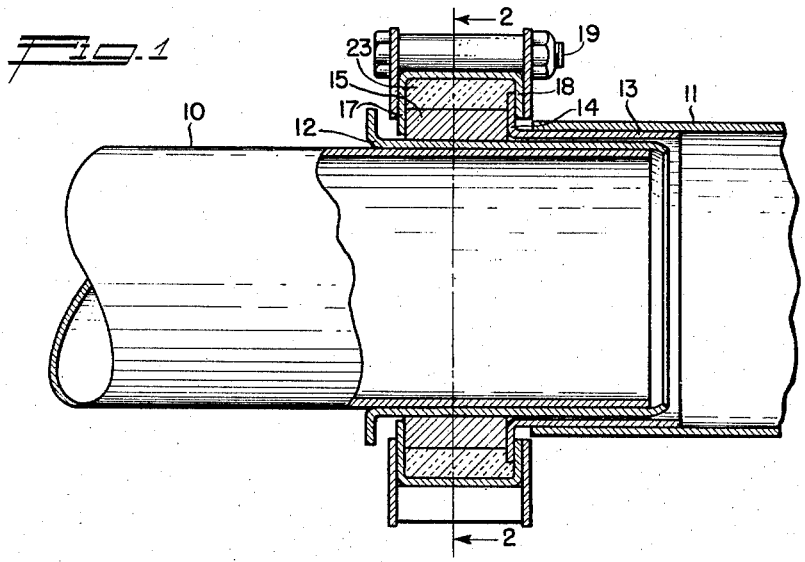
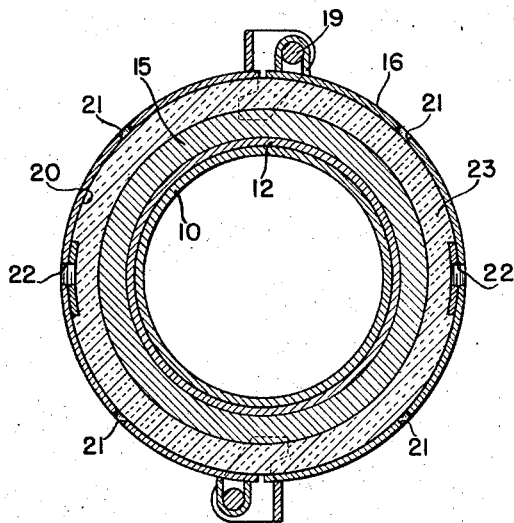
INVENTOR.
JOHN S. PINAIRE
BY
George C. Sullivan
Agent Patented Jan. 4, 1949

2,458,024

UNITED STATES PATENT OFFICE 2,458,024

EXPANSION JOINT

John S. Pinaire, Montrose, Calif., assignor to Lockheed Aircraft Corporation, Burbank, Calif.

Application February 12, 1945, Serial No. 577,571

3 Claims. (Cl. 285—183)

This invention relates to slip or expansion joints for high temperature service, and has particular reference to such joints for use in exhaust manifolds and exhaust conduits for internal combustion engines.

The exhaust manifolds and lines from internal combustion engines of the aircraft type reach particularly high operating temperatures, exceeding 1600° Fahrenheit close to the engine exhaust ports, and thus create peculiar problems such as those due to the expansion and contraction of the metal used for the manifold and conduits. For example, a specific airplane having two engines of the inline type, requires twenty-two expansion or slip joints in the exhaust system, there being an average movement at each such joint of approximately five thirty-seconds of an inch between normal (cold) and operating conditions. In addition to the linear expansion problem, some misalignment in installation must be allowed for, which renders axially rigid types of slip joints unsatisfactory.

It is accordingly an object of this invention to provide an improved light-weight, gas-tight slip or expansion joint that can be readily assembled to absorb misalignment between the adjacent parts, and which can be sealed in situ without binding or excessive friction on the sliding parts.

Other objects and features of the invention will be readily understood from the following detailed description of a typical preferred form of the invention wherein reference will be made to the accompanying drawings in which:

Figure 1 is a longitudinal elevation, with parts broken away to show a central section, of a slip or expansion joint embodying the features of this invention; and, Figure 2 is a cross section on the line 2—2 of Figure 1.

As shown on the drawings, a pair of tubular conduits 10 and 11 are sufficiently different in diameter to allow the tube 10 to enter tube 11, it being preferable to have the hot gases flow from 10 to 11 in order to produce a suction effect on the joint and thus off-set the pressure differential in the conduit to induce leakage of air inward instead of leakage of gas outwardly, as well as to facilitate the flow of the exhaust gas.

The joint to be described in detail is more elaborate than would be necessary for less critical installations, since the illustrated embodiment is subject to continuous movement and wear, and it is desirable to be able to replace worn elements when overhauling an airplane engine, which outlasts several exhaust systems because of the high temperatures and adverse operating conditions imposed thereon. In order to provide for ready replaceability, I provide wearing sleeves 12 and 13 attached respectively to the tubes 10 and 11, the sleeves being snug fits on or in their corresponding tubes and being spot welded or otherwise secured thereto in such a way as to improve the rigidity and maintain a true circle. A slight diametrical clearance, sufficient to absorb normal misalignment between the tubes 10 and 11, is provided between the sleeves 12 and 13, and a similar clearance would desirably be provided between the tubes 10 and 11 if the wearing sleeves 12 and 13 were to be omitted.

The sleeve 13, or the tube 11 if the sleeve 13 is omitted, is provided with an out-turned flange 14 which serves as an abutment against which is clamped a seal ring 15, by means of a split channel section collar 16, the flanges 17 and 18 of which respectively engage the side of the ring 15 and the flange 14. The split halves of the collar 16 may be placed about the assembled joint and secured together as by bolts 19 as shown. The collar is sufficiently large to provide an annular chamber 20 externally of the ring, which chamber is vented at several points 21 and provided with one or more openings 22 through which a refractory material 23, such as fire clay, or asbestos furnace cement, is injected, as by a collapsible tube or a pressure gun similar to the familiar pressure grease gun, to fill the chamber and thereafter dry to a solid and gas-tight seal between the tube 11 and the ring 15.

It is usual practice to form aircraft engine exhaust systems from stainless steel formed sheet or tubing because of the high temperature and corrosive nature of the exhaust gases. The seal ring 16 may also be formed of stainless steel or of various high or low alloy cast irons or "Iconel," preferably having approximately the same coefficient of expansion with changes in temperature, the seal ring being also desirably of a material that will not seize or gall on the sleeve 12 or tube 10, as the case may be, to which it is closely fitted to form a metal to metal sliding, but gas-tight joint which should remain free from seizure or increased clearances over a wide range of temperatures.

I have found that fire clay mixed to the usual mortar consistency, as well as various types of high temperature furnace or asbestos cements, all of which set or bake to hard and temperature resistant solids, are satisfactory backing and sealing materials for the seal ring 15. Such refractory material seals serve to compensate for normal initial misalignments between the axes of tubes 10 and 11, the seal ring 15 being aligned with tube 10 and sealed to tube 11, the latter sealing operation compensating for and absorbing any initial misalignment. While I contemplate the use of water-mixed cements reduced to the consistency of mortar for injection and hardened in situ in the collar 16, it will be evident that aqueous cements are not essential for my purpose, since other temperature resistant cements of initial plastic consistency are available.

It will thus be seen that I have invented an improved slip or expansion joint that can be installed in situ to permit subsequent axial expansion between adjacent sections of exhaust manifolds and conduits and wherein a metal to metal gas seal is provided by sealing a ring-like member to one section in such a manner as to permit relative axial movement of the ring-like member on the other section.

Having described only a typical form of the invention, I do not wish to be limited to the specific details herein set forth, but wish to reserve to myself any variations or modifications that may appear to those skilled in the art or fall within the scope of the following claims.

I claim as my invention:

1. An axial expansion connection comprising a pair of telescoping conduit elements, a first wearing sleeve applied to the exterior of the inner conduit element, a second wearing sleeve applied to the interior of the outer conduit element, there being a limited clearance between the two sleeves, said second sleeve having a radial flange formed thereon on the end overlying the inner conduit element, a seal ring having a sliding but gas-tight fit on the first mentioned sleeve, a channel member adapted to clamp said seal ring to the flange of the second sleeve, said channel member forming an annular space surrounding the periphery of said seal ring, and a refractory material filling the annular space in said channel member.

2. In an expansion joint for use between adjacent telescoping sections of exhaust manifolds and the like, a radial flange associated with the overlying manifold section, a seal ring so constructed and arranged as to make axial sliding but gas-tight engagement with the underlying manifold section and adapted to abut against said radial flange associated with the overlying manifold section, a channel member adapted to clamp said seal ring to said radial flange, said channel member having an annular space surrounding the periphery of said sealing ring, and a refractory material filling the annular space in said channel member.

3. In an expansion joint for use between adjacent telescoping sections of exhaust manifolds and the like, a radial flange associated with the overlying manifold section, a seal ring so constructed and arranged as to make axial sliding but gas-tight engagement with the underlying manifold section and adapted to abut against said radial flange associated with the overlying manifold section, a channel member adapted to clamp said seal ring to said radial flange, said channel member having an annular space surrounding the periphery of said sealing ring, and an initially plastic refractory material cast in said annular space and hardened in situ therein during the assembly of said expansion joint.

JOHN S. PINAIRE.

REFERENCES CITED

The following references are of record in the file of this patent:

UNITED STATES PATENTS

| Number | Name | Date |
| --- | --- | --- |
| 1,513,315 | Cook | Oct. 28, 1924 |
| 2,301,495 | Abegg | Nov. 10, 1942 |